(12) United States Patent
Chamberlin

(10) Patent No.: US 6,624,755 B1
(45) Date of Patent: Sep. 23, 2003

(54) LIQUID LEVEL SENSOR APPARATUS AND METHOD

(75) Inventor: Edward R. Chamberlin, Cincinnati, OH (US)

(73) Assignee: Standex International Corp., Pelham, NH (US)

( * ) Notice: Subject to any disclaimer, the term of this patent is extended or adjusted under 35 U.S.C. 154(b) by 0 days.

(21) Appl. No.: 10/184,010

(22) Filed: Jun. 27, 2002

(51) Int. Cl.⁷ .............................................. G08B 21/00
(52) U.S. Cl. ...................... 340/620; 73/290 R; 73/291; 73/304 R; 340/612; 340/618
(58) Field of Search ................................ 340/612, 618, 340/620; 73/290 R, 291, 304 R

(56) References Cited

U.S. PATENT DOCUMENTS 4,628,302 A * 12/1986 Barr et al. .................. 340/620
5,708,412 A * 1/1998 Proulx ........................ 340/449

* cited by examiner

Primary Examiner—Daniel J. Wu
Assistant Examiner—Lam Pham
(74) Attorney, Agent, or Firm—William B. Ritchie

(57) ABSTRACT

A liquid level sensor for conductive liquids having a bias ring to prevent false "full" indications. The sensor is an inexpensive conductive probe that can be installed in any tank or container used to contain a conductive liquid. The build up of residue such as sludge on the inside of the container wall and probe pieces can cause a short between the probe and ground. This situation will result in falsely showing that the level of the liquid being measured is at least at the minimum predetermined requirement even though the actual level may be far less than that amount. The bias ring is a metal ring that is placed around the insulating base of the sensing probe between the probe tip and the top inside of the tank. The probe is then given a charge (positive for negative ground systems) which interrupts the current path between the sensing tip of the probe and ground via the conducting residue. Consequently, the sensor will read correctly despite the conductive residue that may be present.

10 Claims, 3 Drawing Sheets

LIQUID LEVEL SENSOR APPARATUS AND METHOD

FIELD OF THE INVENTION

This invention relates to liquid level sensor, in particular, the use of a conductance measuring sensor to determine the level of a conductive liquid contained within a vessel.

BACKGROUND OF THE INVENTION

The use of devices to indicate the level of liquid within a tank or container is well known in the art. The need for knowing whether a liquid in a container is above or below a predetermined level is found in a many very different situations. Typical of those situations where the liquid level must not be permitted to fall below a predetermined level are found in automobile radiators, windshield washer containers or oil in an engine crankcase. The situation where the level can be too high is also common such as found with a recreational vehicle holding tank. Applications for such equipment is also found in industry where frequently the liquid in question is extremely corrosive as experienced with chemical reagent reservoirs which must be filled once the chemical has fallen below a particular amount in order to keep a process running.

A typical float-type of liquid level sensor is disclosed in U.S. Pat. No. 4,386,337, issued to Todd on May 31, 1983. This device is said to be useful for measuring the level of oil in an engine crankcase or transmission fluid in a reservoir. An electrically conductive float disposed within an encapsulator and movably responsive to the liquid level is provided. This movement is then determined. The problem associated with sludge buildup resulting in shorts bypassing the proper electrical pathways is not directly discussed. While Todd does suggest that by having his encapsulator with open upper and lower ends provides for self-flushing of debris, it is unclear how this can inhibit or stop the problems associated with residue formation, particularly as found in older systems.

The type of devices used to measure the liquid level also varies substantially. The use of floats, changes in capacitance, optical readers, weight measurements of the liquid are just a few examples of techniques that have been adopted to serve as an indicator of the surface level of a liquid. Some devices have attempted to utilize non-invasive measures, that is, a sensor that is outside of the liquid container.

Representative of this genre is U.S. Pat. No. 4,749,988, issued to Berman et al. on Jun. 7, 1988. The '988 discloses the use of a pair of conductive band electrodes oriented in parallel so that the gap between the electrodes corresponds to the liquid surface level to be measured. The change in capacitance between the electrodes as the liquid level rises and falls serves as the indicator. While this device solves the corrosive problem found in processing industries using materials in liquid form, its use is limited to containment vessels which have sufficient outside room to put the sensor in place. Further, this type of sensor is expensive to manufacture in that it must be shaped to correspond to the particular shape of the vessel being used. Also, the thickness and material used for the vessel can also appreciably impact the accuracy and sensitivity of the device. Whether this will also solve the problem of residue buildup on the inside of he container is not know as Berman et al. does not discuss this issue.

U.S. Pat. No. 5,315,872, issued to Moser on May 31, 1994, discloses a liquid level sensor for an electrically conductive liquid. The device requires the use of an electrically conductive material for constructing the tank. Thus, many common used containers are unsuitable for use with this device without having substantial additional expense. A voltage source supplies an electrical charge to the tank walls, with ground potential being supplied to the liquid contain therein. The capacitance between the tank walls and liquid varies with the volume of liquid in the tank. The problem of false "full" readings is not discussed.

One of the potentially simplest and least expensive methods for the measurement of the level of a liquid is the use of an electrically conductive liquid as a part of a resistive circuit to ascertain the level. Representative of this genre is found in U.S. Pat. No. 4,277,773, issued to Blatnik on Jul. 7, 1981. This reference discloses a device for measuring the level of cooling liquid within a radiator. The radiator is grounded and an insulated probe is installed in the radiator and measures the level via interconnecting the sensor with ground to obtain a conductivity measurement. A second sensor is provided to measure a hot liquid level in the same manner. While this device is simple and inexpensive to build, no protection against false "full" readings due to the accumulation of conductive sludge or other residue is disclosed or suggested.

U.S. Pat. No. 5,719,556, issued to Albin et al. on Feb. 17, 1998, discloses still another variation of the a liquid level sensor that utilizes the measurement of resistance as an indicator. Albin et al. do recognize the problem of shorts from the sensor tip to ground via a conductive path through sludge. However, the inventors claim that merely insulating the sensing rods except at the tip will eliminate this problem. Further, their device is quite complicated and expensive requiring the use of alternating current, an oscillator, and filters as well as other circuitry in order to achieve their objectives.

Therefore, a simple conductive-type of liquid level sensor for conductive fluids that is easy and inexpensive to manufacture, can be attached in a variety of tanks and containers without substantial modification of those tanks and prevents false "full" indications due residue buildup is not found in the prior art.

SUMMARY OF THE INVENTION

It is an aspect of the invention to provide a liquid level sensor that prevents false "full" indications due to the buildup of residue on the inside of the container.

It is another aspect of the invention to provide a liquid level sensor that provides a bias ring that is electrically charged the same polarity as the tip of the probe of the sensor so as to prevent a current path being established between probe tip and ground via any residue buildup on the probe and inside of the container.

It is an aspect of the invention to provide a liquid level sensor that can be used with any conductive liquid that has a level that needs to be determined.

It is still another aspect of the invention to provide a liquid level sensor that can be inexpensively manufactured.

Another aspect of the invention is to provide a liquid level sensor which is a conductive-type of design.

It is an aspect of the invention to provide a liquid level sensor that can be used where the liquid and its container are not preferably in contact with an electrical ground.

Finally, it is an aspect of the invention to provide a liquid level sensor that work equally as well in conductive liquid situations which are either positively or negatively grounded by correspondingly adjusting the bias voltage of the probe bias ring.

The invention is a liquid level sensor apparatus for determining the level of a conductive liquid held within a container having inside walls, one of which is an attachment wall. The container is subject to the accumulation of residue as a consequence of the liquid contained therein. A first housing which is attached to attachment wall of the container is provided. An insulated probe having an attachment end and a sensor end is also provided. The attachment end of said insulated probe is connected to said first housing such that the probe end is able to contact the conductive liquid held therein at a first predetermined level. A conducting sensor tip having a voltage is disposed at the probe end of said insulated probe. A ground connection having an electrical polarity is connected to the conductive liquid. A circumferential ring is attached around said insulated probe adjacent to the attachment end of said insulating probe. A bias voltage having the opposite polarity of said ground connection and having a voltage that corresponds to the voltage of said conducting sensor tip is applied to said circumferential ring. Once the liquid is in contact with said conducting sensor tip at the first predetermined level, a circuit is completed to said ground connection which indicates a "full" condition. If the liquid is not in contact with said conducting sensor tip at the predetermined level, a "not full" condition is indicated. The bias voltage on said circumferential ring prevents a false indication of a "full" condition by preventing the completion of circuit from said conducting sensor tip to said ground connection via residue on the container walls and said insulated probe even when the liquid is not in contact with said conducting sensor tip.

DETAILED DESCRIPTION OF THE INVENTION

Figure 1:
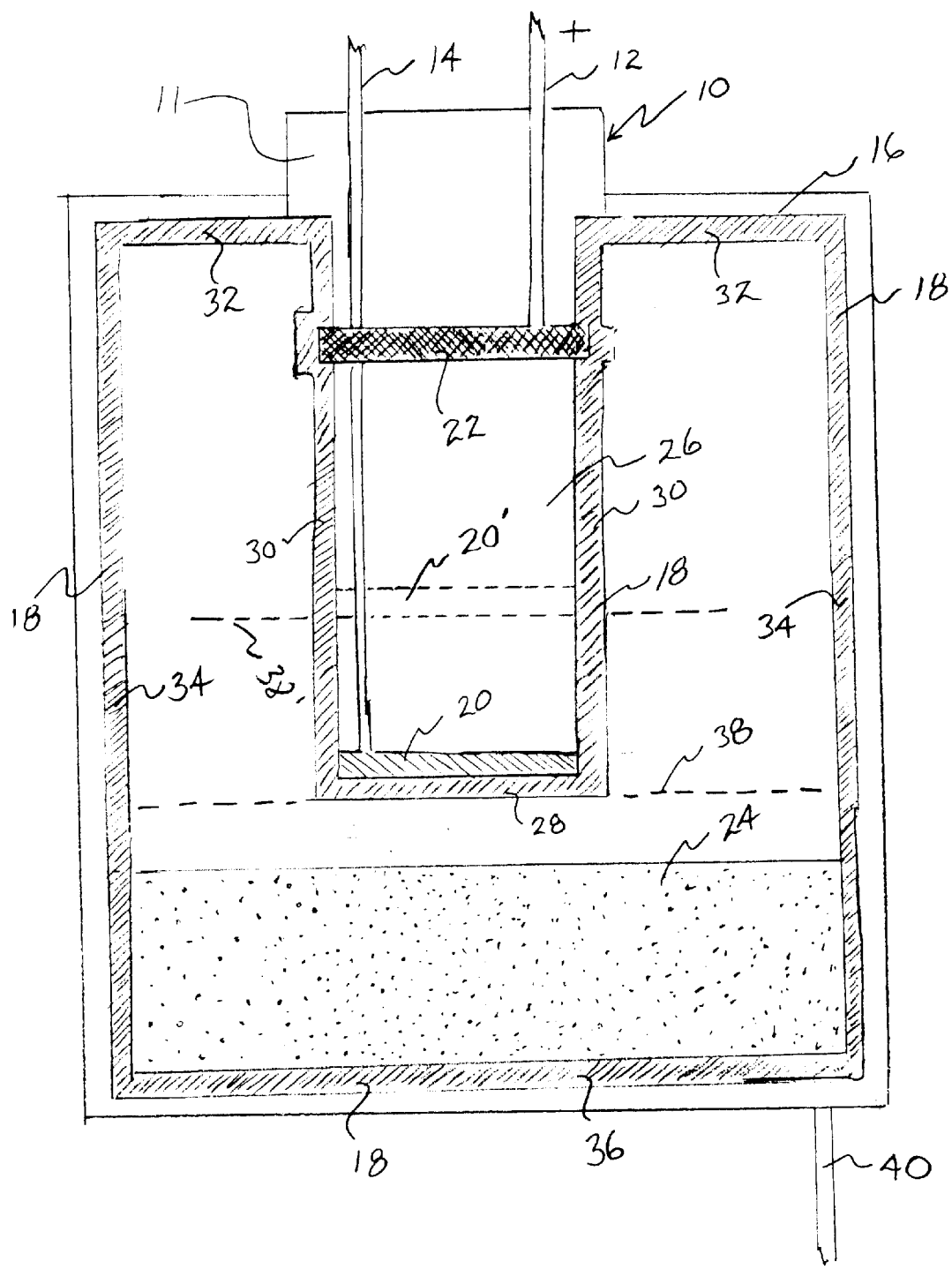
FIG. 1 is an illustration of the liquid level sensor in accordance with the invention.

Referring first to FIG. 1, an illustration of the sensor 10 is shown. The invention is a liquid level sensor that prevents a false "full" reading due to the build-up of conductive residue 18. Residue 18 could be sludge, fungus or even conductive liquid 24 that fail to drain from the inside of tank 16. This type of situation typically worsens in aging systems due to fluid contamination by metals and salts in the system.

Tank 16 could be a radiator, wind washer fluid container or any tank or container having a stored conductive liquid 24 which must be maintained below or at a predetermined level 38. As noted above, many elaborate schemes have been developed to determine when liquid 24 is less than level 38. However, the least expensive of these is a simple conductive circuit having a sensor that causes a light or other indicator well known in the art to be either activated or deactivated once the liquid level is below or at level 28.

As shown, sensor 10 features an insulated rod 26 which has an exposed metal probe tip 20 at the end. Insulated rod is inserted into housing 11 and housing 11 attaches the sensor 10 to tank 16. Sensor 10 can be inserted into the top or side (not shown) of tank 16. The length of insulated rod 26 determines the point at which liquid level 38 is to be considered low and needing attention. The liquid 24 is electrically grounded through tank 16 via ground connection 40.

Another probe 20' or additional probe tips (not shown) could be added if desired to make the apparatus function as a multi-level sensor. The additional probe 20' will function the same as probe 20 except to indicate a different liquid level 38'.

Figure 2:
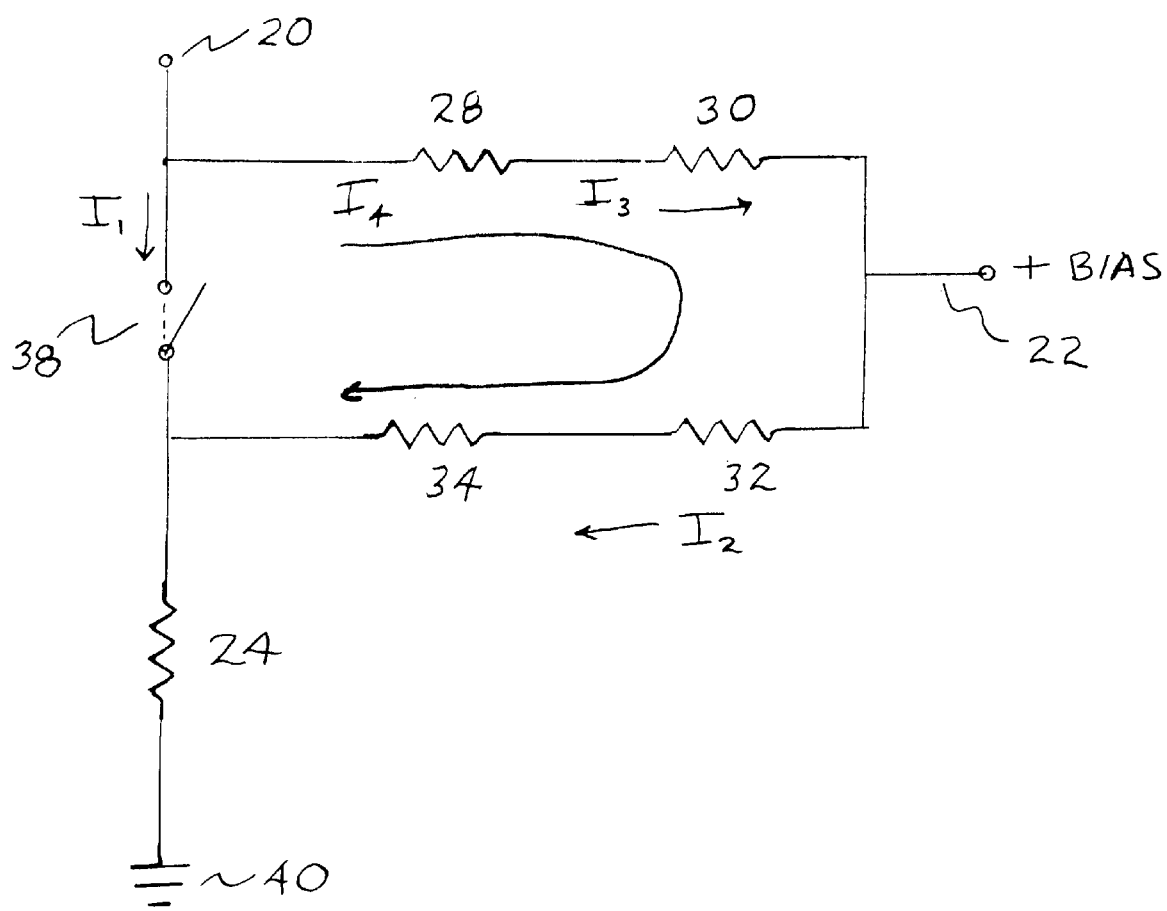
FIG. 2 is an equivalent schematic diagram of the apparatus shown in FIG. 1.

Referring now to FIG. 2, the operation of sensor 10 is shown. First, consider the conductive circuit in the absence of conductive residue 18 on the inside of tank 16 and on sensor 10. Probe tip 20 connects the sensor 10 to the fluid ground 40 via conducting fluid 24 if the liquid level is greater than or equal to level 38. Level 38 is depicted as a "switch". Thus, the circuit is completed and the voltage potential of sensor tip 20 swings from a plus potential to ground, thus indicating that liquid 24 is at least at the predetermined minimum, that is, "full".

Again in the absence of conductive residue 18, if the liquid level falls below 38, this behaves an open "switch" 38, current $I_1$ would be broken. Thus, a "low" liquid level is detected.

However, the presence of residue 18 causes a conductive path to be obtained through conducting residue 18 as resistances 28, 30, 32, 34, acting as series of resistors, from probe tip 20 to electrical ground 40 providing current $I_4$. Note that resistances in FIG. 2 correspond to the locations of residue 28, 30, 32, 34 in FIG. 1. This buildup of conductive residue causes sensor 10 to indicate a false "full" even when liquid 24 falls below level 38 as shown in FIG. 1. since residue 18 acts as a short circuit.

However, by providing a circumferential ring 22 around the outside of insulated rod 26 between probe tip 20 and the top of tank 16, the false "full" indication due to the conducting residue 18 is eliminated. As long as the positive voltage potential of bias voltage 22 is at least as great as the positive voltage potential of probe tip 20, current $I_3$ will be substantially zero. Thus, bias 22 acts to prevent probe tip 20 from incorrectly swinging from plus to ground as if liquid 24 were in contact with probe tip 20. Thus, sensor 10 will properly indicate a "low" condition exists as if the conductive residue 18 were not present.

If the level of liquid 24 again rises to touch probe tip 20, then probe tip 20 voltage will be very close to ground potential because current $I_1$, will follow the path of least resistance (shortest path) through the mass of conductive liquid 24. Some extraneous current $I_2$ will flow from bias 22 to ground 40 through the residue 32, 34 but this will not affect the probe tip 20 potential. An external means (not shown) may be used to limit this current using techniques well known in the art if that is desired.

The above explanation assumes that conducting liquid 24 causes probe tip 20 to be negative when in contact with liquid 24. Therefore, the bias ring 22 should be positively charged. If the opposite were true, i.e., conducting liquid 24 caused probe tip 20 to be positive when touched by conducting liquid 24, then bias ring 22 should be correspondingly negatively charged.

As noted in the alternative embodiment discussed below, the wire for bias ring 22 can be eliminated by using the sensor wire 14, thus eliminating the cost of additional wire and connector.

Figure 3:
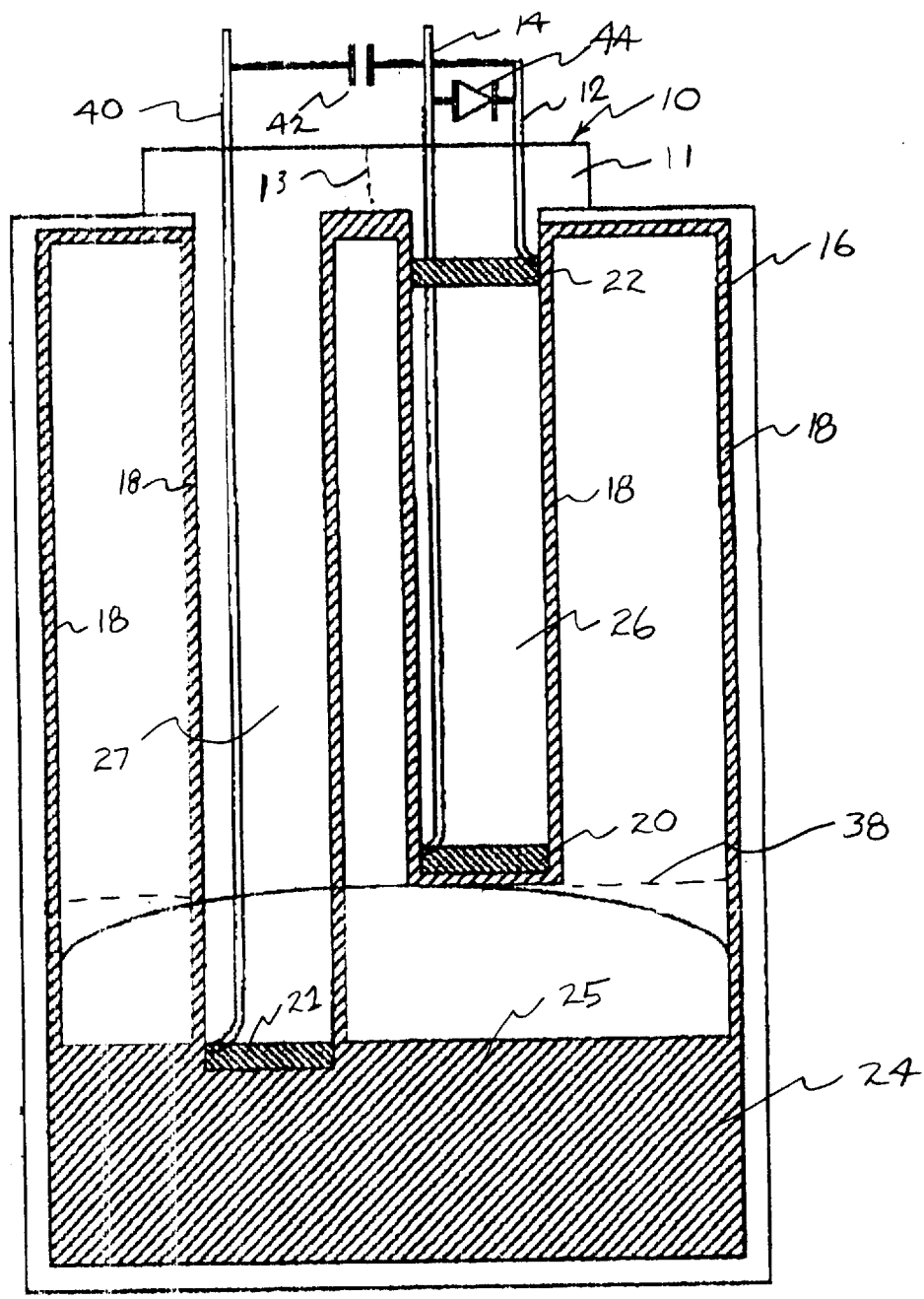
FIG. 3 is an illustration of an alternative embodiment of the invention.

Referring now to FIG. 3, an alternative embodiment of the invention is shown. In this embodiment, the invention can be used with any conductive liquid having a container that is not normally conducted to ground. This embodiment also features the use of single wire to feed both the sensor probe and the bias voltage. Either of these features can be used independent of one another. That is, it is possible to use a second insulating rod 27 which having a metal tip 21 connected to, wire 40 without using a single feed wire 14 with the associated capacitor 42 and diode 44 to power the probe tip 20. Also, it also possible to use the single feed wire 14 arrangement shown in FIG. 3 with the ground 40 design shown in FIG. 1. Further, the embodiment shown in FIG. 3 can also be made as a multi-level instrument as shown in FIG. 1.

As shown, rod 27 is lower than rod 26 in order to provide a predetermined amount of resistance (due to the conductance of fluid 24) so that the circuit properly indicates the liquid level. It is essential to have the ground probe at least as long, but preferably longer and at least as lower, but preferably lower than the sensor probe.

Rods 26, 27 could be fitted are fitted to housing 11 and, in turn, housing 11 attaches the apparatus to tank 16. While housing 11 for both rods is shown as an integral part, it could be divided along line 13 so that each rod 26, 27 has its own housing 11.

In order to prevent the expense and extra circuitry that is required for a separate feed for bias ring 22 and probe tip 21, as shown, wire 12 can be eliminated. In this embodiment, sensor wire 14 is connected to "plus" for a short period of time, then electrically opened and the voltage quickly measured. Circuitry well known in the art is provided to switch the sensor wire 14 from positive to a voltage "sample and hold" measurement mode. As shown, capacitor 42 is connected from bias ring 22 to ground 40 and diode 44 connects sensor tip 20 via wire 14 to bias ring 22 via lead 12. Sensor tip 20 is pulled positive by external electronics (not shown) which also charges capacitor 42 through diode 44. Then, sensor tip 20 is switched electrically open and its electrical potential is measured. If fluid 24 is at level 38 such that fluid 24 is in contact with probe tip 20, then the voltage potential of sensor tip 20 rapidly returns to ground 40 potential to indicate a "full" reading. If fluid 24 is below level 38 such that fluid 24 is not in contact with probe tip 20, then sensor tip 20 will have a positive potential only as long as capacitor 42 remains charged. Consequently, as noted above, this design has the advantage of having only two wires to the invention rather than three for the embodiment shown in FIG. 3.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. A liquid level sensor apparatus for determining the level of a conductive liquid held within a container having inside walls, one of which is an attachment wall, wherein the container is subject to the accumulation of residue as a consequence of the liquid contained therein, said sensor comprising:
   a first housing which is attached to attachment wall of the container;
   an insulated probe having an attachment end and a sensor end, wherein the attachment end of said insulated probe is connected to said first housing such that the sensor end is able to contact the conductive liquid held therein at a first predetermined level;
   a conducting sensor tip having a voltage and disposed at the sensor end of said insulated probe;
   a ground connection having an electrical polarity, said ground connection being in contact with the conductive liquid;
   a circumferential ring attached around said insulated probe adjacent to the attachment end of said insulating probe; wherein a bias voltage having the opposite polarity of said ground connection and having a voltage that corresponds to the voltage of said conducting sensor tip is applied to said circumferential ring;
   wherein once the liquid is in contact with said conducting sensor tip at the first predetermined level, a circuit is completed to said ground connection which indicates a "full" condition and wherein when said conducting sensor tip is not in contact with the liquid at the predetermined level, a "not full" condition is indicated, and wherein the bias voltage on said circumferential ring prevents a false indication of a "full" condition by preventing the completion of circuit from said conducting sensor tip to said ground connection via residue on the container walls and said insulated probe even when the liquid is not in contact with said conducting sensor tip.

2. The liquid level sensor apparatus of claim 1 further comprising a second housing and a ground probe, wherein said ground connection is provided by said ground probe, said ground probe having an attachment end and a ground end with an electrical ground tip, wherein the attachment end of said ground probe is connected to said second housing such that the ground tip electrically contacts the conductive liquid held therein at a second predetermined level.

3. The liquid level sensor of claim 2 wherein said first and second housings are integral with one another.

4. The liquid level sensor of claim 2 wherein said first and second predetermined levels are substantially the same.

5. The liquid level sensor of claim 1 further comprising:
   a capacitor that is connected between said ground connection and said bias ring;
   a diode that is connected between a wire that provides the voltage to said conducting sensor tip of said insulating probe and said bias ring such that when said sensor tip is charged electrically, said capacitor is also charged and said bias ring is also charged to the same polarity as said sensor tip;
   wherein contact of said sensor tip with the liquid causes said sensor tip to change to the potential of said ground connection, thus providing a "full" condition and wherein said sensor tip is not contact with the liquid, a "not full" condition will be indicated for as long as said capacitor remains charged even if residue is present.

6. The liquid level sensor of claim 2 further comprising:
   a capacitor that is connected between said ground connection and said bias ring;
   a diode that is connected between a wire that provides the voltage to said conducting sensor tip of said insulating probe and said bias ring such that when said sensor tip is charged electrically, said capacitor is also charged and said bias ring is also charged to the same polarity as said sensor tip;
   wherein contact of said sensor tip with the liquid causes said sensor tip to change to the potential of said ground connection, thus providing a "full" condition and wherein said sensor tip is not contact with the liquid, a "not full" condition will be indicated for as long as said capacitor remains charged even if residue is present.

7. The liquid level sensor of claim 1 wherein electrical power to said apparatus is provided by alternating current in order to reduce electrolysis of conductive parts wherein the electrical charge on said bias ring and the fluid are substantially 180 degrees out of phase with respect to one another thus said bias ring and the fluid are of opposite polarity.

8. A method of determining the level of a conducting liquid in a container subject having an accumulation of a conducting residue in contact with the conducting liquid, said method comprising the steps of:

electrically grounding the conducting liquid so that the liquid is at ground potential;

charging a sensor with a sensor voltage that is substantially different than said ground potential of the liquid;

biasing a portion of the conducting residue with biasing voltage that corresponds to said sensor voltage, such that said portion of charged residue is between said charged sensor and the liquid;

contacting the liquid with the sensor so that said sensor voltage drops to ground potential wherein a "full" condition is provided;

removing the contact of the sensor with the liquid so that said sensor voltage remains substantially different than said ground potential of the liquid wherein a "not full" condition is provided even when an electrical pathway is provided from the sensor to the liquid via the residue, which would, absent the biasing voltage, otherwise indicate a false "not full" condition.

9. The method of claim 8 wherein said sensor voltage and said biasing voltage are charged positive.

10. The method of claim 8 wherein said sensor voltage and said biasing voltage are charged with alternating current such that the electrical charge of said biasing voltage and the fluid are substantially 180 degrees out of phase with respect to one another thus said biasing voltage and the fluid are of opposite polarity.

* * * * *